US006454392B1

United States Patent
Lopez et al.

(10) Patent No.: US 6,454,392 B1
(45) Date of Patent: Sep. 24, 2002

(54) ADAPTIVE DEPLETION MASKS FOR IMPROVING PRINT QUALITY

(75) Inventors: Matthew G Lopez, Escondido; Jason R Arbeiter, Poway; Michael S Gray, Encinitas, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 67 days.

(21) Appl. No.: 09/774,193

(22) Filed: Jan. 29, 2001

Related U.S. Application Data

(63) Continuation-in-part of application No. 09/757,363, filed on Jan. 8, 2001.

(51) Int. Cl.[7] .............................. B41J 2/21; B41J 29/38
(52) U.S. Cl. ........................................... 347/43; 347/14
(58) Field of Search .............................. 349/43, 19, 40, 349/14; 358/1.18

(56) References Cited

U.S. PATENT DOCUMENTS

| | | | |
|---|---|---|---|
| 5,387,976 A | * | 2/1995 | Lesniak ........................ 347/19 |
| 5,574,832 A | | 11/1996 | Towery et al. |
| 5,706,414 A | | 1/1998 | Pritchard |
| 6,042,211 A | | 3/2000 | Hudson et al. |
| 6,132,021 A | | 10/2000 | Smith et al. |
| 6,283,572 B1 | * | 9/2001 | Kumar et al. .................. 347/19 |
| 6,299,284 B1 | * | 10/2001 | Alfaro .......................... 347/43 |

* cited by examiner

Primary Examiner—Thinh Nguyen
(74) Attorney, Agent, or Firm—Robert C. Sismilich

(57) ABSTRACT

A swath printing system and pixel depletion methods compensate for the effects of defective printing elements by adjusting the pixel depletion mask used during printing to minimize the amount and location of extraneous unprinted spaces caused by the defective printing elements. A printing element quality detector determines which printing elements are functional and which are defective. Based on this information, an image processor then selects or constructs a depletion mask having depleted pixel positions chosen to reduce the adverse effects on print quality caused by the defective printing elements, thus maintaining high image quality for the printed output. Pixel depletion is preferably performed at the image pixel level, but can alternatively be performed at the color plane pixel level.

19 Claims, 12 Drawing Sheets

ADAPTIVE DEPLETION MASKS FOR IMPROVING PRINT QUALITY

CROSS-REFERENCE TO RELATED APPLICATIONS

The present application is a continuation-in-part of the co-pending U.S. application Ser. No. 09/757,363, by Lopez et al., filed Jan. 8, 2001, titled "Method for Improving the Quality of Printing Processes Involving Black Pixel Depletion". This application also relates to the co-pending U.S. application Ser. No. 09/399,430, by Bland et al., filed Sept. 20, 1999, titled "Customizing Printmasks for Printhead Nozzle Aberrations". Both of these previous applications are assigned to the assignee of the present invention and are hereby incorporated by reference in their entirety.

FIELD OF THE INVENTION

The present invention relates generally to a method for improving the quality of printing processes involving pixel depletion, and pertains more particularly to a method for adaptively selecting pixel depletion mask patterns based on the quality of individual printing elements in a swath printer.

BACKGROUND OF THE INVENTION

In order to print an image such as a text document, a graphic or a photograph, on a print medium such as paper or transparency material, a typical high quality color inkjet printer prints a band, or "swath", at a time of colored ink drops which correspond to the data pixels that comprise the image. Typically, four different color inks (cyan, magenta, yellow, and black) are used by the printer to print the range of colors contained in the image. By printing successive swaths, the document or image is completely formed on the print medium. Such inkjet printers are described by W. J. Lloyd and H. T. Taub in "Ink Jet Devices," Chapter 13 of *Output Hardcopy Devices* (Ed. R. C. Durbeck and S. Sherr, San Diego: Academic Press, 1988). The basics of this technology are further disclosed in various articles in several editions of the *Hewlett-Packard Journal* [Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No.1 (February 1994)], incorporated herein by reference.

When printing a swath, certain high-density regions of the printed medium may receive a relatively large total amount of ink because of the darkness of the image in those regions. In these regions, the ink may not dry quickly enough to avoid blotting onto the preceding or following page in the output tray of the printer, or smearing when handled by the user. Large amounts of ink in an area can cause certain print media to buckle or cockle, or wick into adjacent lower-density regions of the medium, thus degrading the image. In addition, ink may be wasted in high-density regions, because ink drops typically spread out and overlap each other on the print medium, and consequently a lesser total amount of ink in these regions may produce an equal or better quality print of the image.

As a result, in order to reduce ink drying time, paper cockling, and wicking, and/or to decrease ink usage, "pixel depletion" processes (to reduce the density of high-density image regions) have been employed in thermal inkjet printers. Typically, depletion masks have been used to identify pixels targeted for depletion. See, e.g., U.S. Pat. No. 5,706,414 to Pritchard, assigned to the assignee of the present invention and incorporated herein by reference in its entirety. The depletion masks are typically chosen so as to reduce the density enough to conserve ink and prevent defects (such as those described above) which are due to excessive inking of the medium, but not so as to be visually perceptible to the user as "holes" or unprinted spaces in the printed image. Beneficial depletion masks, therefore, carefully control the quantity and location of the depleted pixels within and between swaths.

Unfortunately, the printhead cartridges containing the individual printing elements which controllably deposit the ink drops on the print medium may degrade during the course of their useful life, resulting in misdirected ink drops which are not deposited in the intended location, or no ink drops at all. Each defective printing element typically results in a row or line of unprinted spaces on the print medium. In addition, depending on the location of these degraded printing elements in the printhead cartridge and the locations of depleted pixels in the depletion mask, more total unprinted spaces, or unprinted spaces clustered together in a single region can occur, resulting in a visually unpleasing printed medium with poor image quality. Accordingly, it would be highly desirable to have a way to mitigate the adverse impact on print image quality of defective printing elements in the printer.

SUMMARY OF THE INVENTION

In a preferred embodiment, the present invention provides a new and improved swath printing system that adaptively depletes pixels based on the health of the printing elements so as to achieve a high level of image quality in the printed output despite the presence in the printing system of the defective printing elements. The invention is scalable such that it can be cost-effectively embodied in both high-end and low-end printing systems to mitigate the adverse effects of the defective printing elements. An image processor receives image data, and processes it for printing according to a depletion mask which depletes a predetermined percentage of the pixels in the image data. Following processing, the image processor issues control commands to a print mechanism which emits in response drops of colored ink onto specified locations of a print medium to print the image. The depletion mask defines the location of the individual pixel positions to be depleted, and selects those locations such that relatively more of them positions correspond to pixel locations that will be printed by defective printing elements, and relatively fewer of them corresponding to pixel locations for functional printing elements. A printing element quality detector identifies the defective printing elements, allowing the image processor to specify where in the depletion mask the depleting positions should be located, or select an appropriate depletion mask from a group of alternate ones.

The present invention may also be implemented as a method for printing pixel rows of an image swath with a swath printer. Defective printing elements of the swath printer are identified, and one or more of the defective printing elements are mapped to the corresponding pixel rows that will be printed by these defective elements. A desired percentage of pixel depletion for the swath is achieved by disabling printing of at least some individual pixel positions in at least one of the pixel rows corresponding to defective printing elements. Printing is preferably disabled for more of the individual pixel positions in pixel rows corresponding to defective printing elements than for pixel rows corresponding to functional printing elements; this may include disabling printing for all of the individual pixel positions in pixel rows corresponding to defective printing elements before disabling printing for any positions in pixel rows corresponding to functional printing elements. In some embodiments, the method modifies image data by replacing the image data pixels corresponding to the disabled pixel positions with non-printing pixels. In other embodiments, the method segregates from the image data a color plane of pixel data for a predetermined ink color, and modifying the color plane pixel data by disabling printing of the color plane pixels corresponding to the disabled pixel positions The present invention may additionally be implemented as a method for printing rows and columns of an image swath with a swath printer, preferably in a single pass. Defective printing elements of the swath printer are identified, and a depletion mask having a predetermined percentage of depleted pixels is provided. The depletion mask has relatively more depleted pixel positions in rows corresponding to the defective printing elements and relatively fewer depleted pixel positions in rows corresponding to functional printing elements. The image swath is processed using the depletion mask in order to deplete the predetermined percentage of pixels from the swath, by disabling printing of pixel positions in the swath at the depleted pixel positions specified by the depletion mask. The depletion mask may be constructed based on the location of the defective printing elements; or alternatively one of a predefined set of depletion mask primitives may be selected based on the location of the defective printing elements, and tiled to form the depletion mask. The depletion mask is preferably arranged such that no two adjacent pixel positions in a vertical column are depleted.

Another embodiment of the present invention is a program storage medium containing a program of instructions executable by a computing apparatus for preparing an image data file having rows and columns of image pixels for printing on a swath printer. Different segments of the instructions are configured to receive data identifying defective printing elements of the swath printer; map at least some of the defective printing elements to corresponding lower print quality rows of the image data file; specify a depletion mask having a predetermined percentage of depleted pixels with more depleted pixel positions in lower print quality rows and fewer depleted pixel positions in other rows; and modify the image data file by replacing image data pixels corresponding to depleted pixel positions with non-printing data pixels.

BRIEF DESCRIPTION OF THE DRAWINGS

The above-mentioned features of the present invention and the manner of attaining them, and the invention itself, will be best understood by reference to the following detailed description of the preferred embodiment of the invention, taken in conjunction with the accompanying drawings, wherein.

DESCRIPTION OF THE PREFERRED EMBODIMENT

Figure 1:
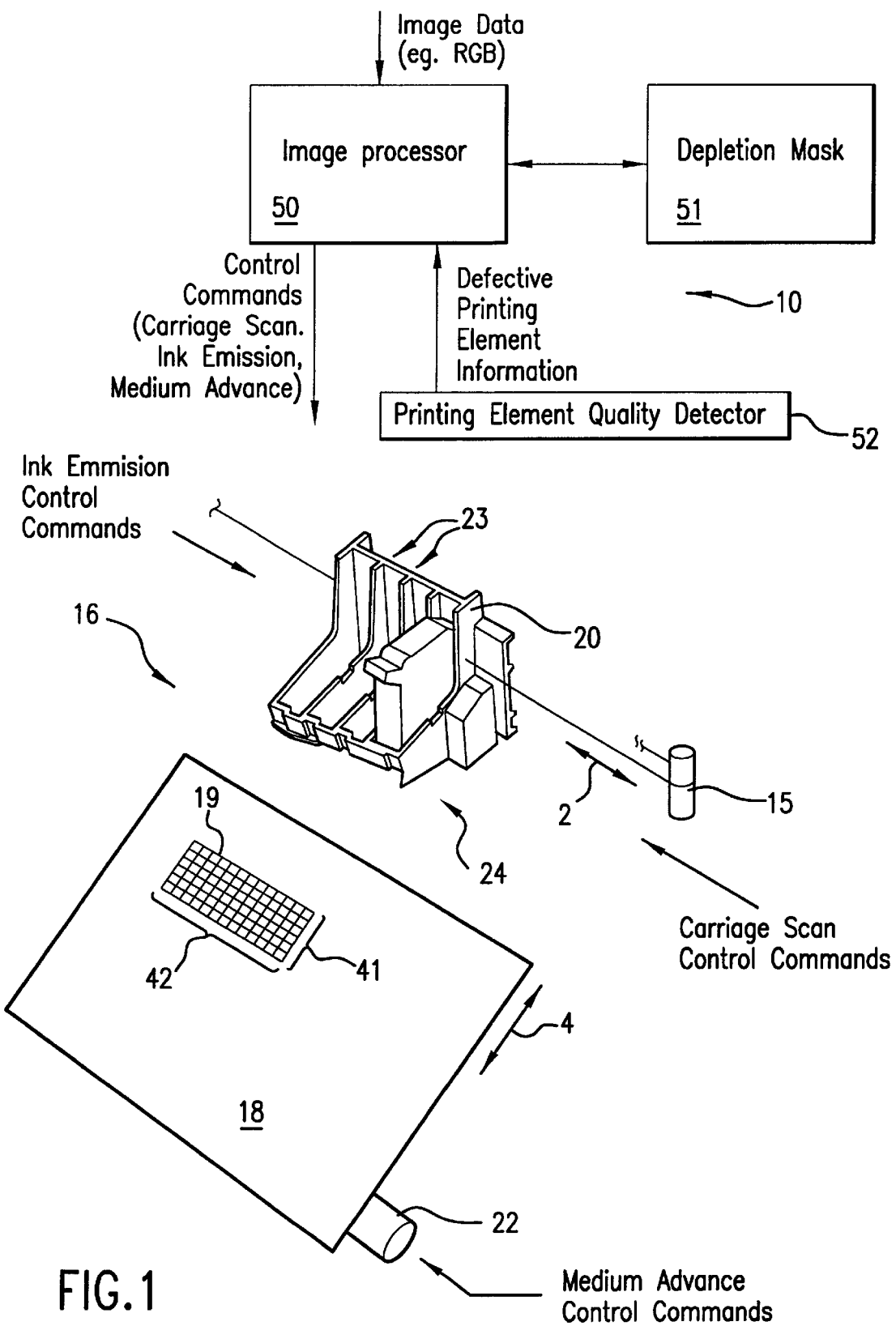
FIG. 1 is a schematic representation of a swath printing system embodying the present invention.

Referring now to the drawings, there is illustrated a swath printing system constructed in accordance with the present invention which, in conjunction with a novel pixel deletion printing method, decreases ink usage and reduces ink drying time, paper cockling, and wicking, while generating high image quality printed output even where defective printing elements exist in the printing system. As best understood with reference to FIG. 1, a preferred embodiment of the swath printing system 10 has a print mechanism 16 for controllable printing drops of at least one colored ink from a plurality of printing elements 24 of a printhead cartridge 21 onto specific pixel locations of a print medium 18, such as paper, transparency film, or textiles, in order to print swaths that form the image. An image processor 50 is connected to the print mechanism 16 for generating and transmitting the control commands thereto. The image processor 50 is adapted to receive image data, to process the data according to a depletion mask 51 connected to the image processor 50, and to generate the appropriate control commands to print the image data at the appropriate locations on the print medium 18 so as to produce the corresponding printed image. The depletion mask 51 enables or "gates" the printing of individual pixels of the image data onto the corresponding location on the medium 18. The depletion mask 51 provides depleting positions which disable the printing of a predetermined percentage of the ink drops in the swath. The percentage of depleted positions in the depletion mask 51 is chosen to be high enough to reduce the density enough to conserve ink and prevent defects due to excessive inking of the medium, but not so high as to be cause the unprinted spaces in the printed image to be visually perceptible to the user as "holes". The depletion mask 51 according to the present invention arranges the depleting positions so that relatively more depleting positions correspond to pixel locations for defective printing elements 24, and relatively fewer depleting positions correspond to pixel locations for non-defective or properly-operating printing elements 24 on the printhead cartridge 21. When the depletion mask 51 of the present invention is used with printhead cartridges 21 having one or more defective printing elements 24, the arrangement of depleting positions advantageously reduces the total amount of unprinted space relative to conventional depletion mask designs, and thus correspondingly minimizes the adverse affects on user-perceived print quality caused by increased unprinted space, particularly in high-density image regions having large areas of dark, uniform color. In the preferred embodiment, the depletion mask 51 is selected by the image processor 50 from a set of predefined alternate depletion masks.

In order to identify the defective printing elements, the swath printing system 10 has the capability to test each of the printing elements 24 of each printhead cartridge 21 to determine whether or not they are functioning properly. For this purpose, the system 10 may include a printing element quality detector 52 for automatically determining defective printing elements 24 and identifying them to the image processor 50, which uses this information to assign the depleting positions as described above, and as will be described subsequently in greater detail. The detector 52 is preferably a sensor, such as an optical or electrostatic in-flight sensor for detecting ink drops from a printing element during flight, an impact sensor which detects ink drops upon impact with the sensor, or an optical reflective sensor which detects printed patterns produced by the printing elements on the medium 18. Alternatively, the system 10 may produce a printed test pattern and have the user examine it to ascertain defective printing elements and input them into to the printing system 10. Additional details on the construction and operation of these sensors, and on methods for the detection and identification of defective printing elements, may be found in the co-pending U.S. application Ser. No. 09/399,430, by Bland et al., heretofore incorporated by reference in its entirety.

Figure 2:
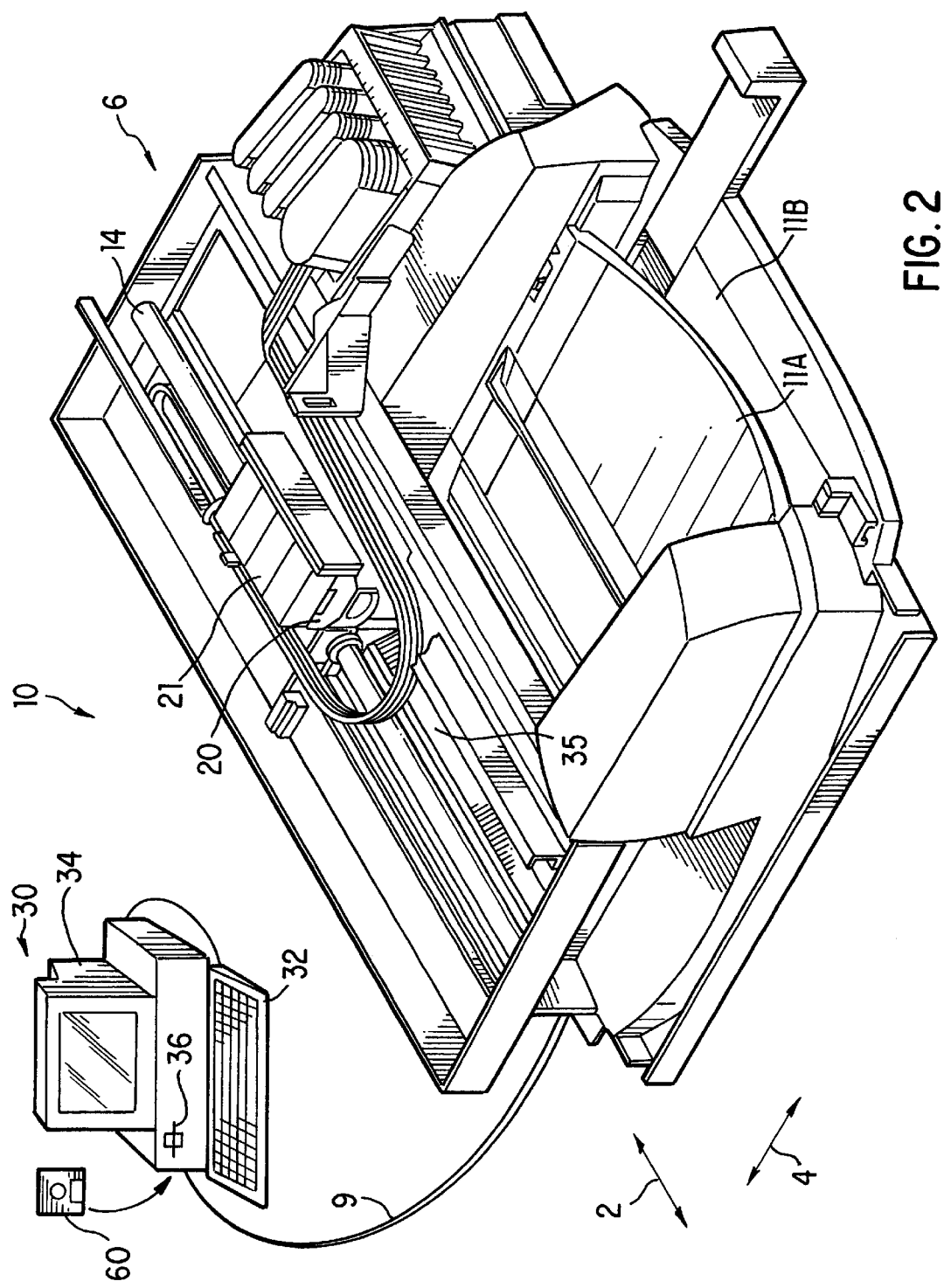
FIG. 2 is a schematic representation of the swath printing system of FIG. 1 incorporating a computer and a swath printer.

Considering the printing system 10 in further detail, and with reference to FIGS. 1 and 2, a preferred embodiment of the printing system 10 includes a swath printer 6 coupled to a computer 30 via a communications interface 9. As well known to those skilled in the art, a preferred embodiment of the computer 30 includes a processor (not shown), memory (not shown), user-interface devices such as a display 34 and a keyboard 32 by which a user can interact with the printing system 10, and a mass storage interface 36 capable of receiving a program storage medium 60 containing segments of a program of instructions accessible and executable by the processor. A preferred embodiment of the swath printer 6 includes a slider rod 14 on which a carriage 20 is moveably mounted. The carriage 20 has stalls 23 for holding at least one printhead cartridge 21 and transporting the cartridges 21 in a printing orientation adjacent the surface of a print medium 18 having a plurality of pixel locations, such as pixel location 19, organized in a rectangular array of rows 41 and columns 42. The carriage 20 is mounted in the printer 6 for relative motion with respect to the print medium 18 during a printing pass. The printing elements 24 on each print cartridge 21, while they may be physically arranged in multiple columns, are logically arranged as a linear array of nozzles substantially orthogonal to a scan axis 2, such that each printing element 24 is capable of depositing the drops of the ink onto a corresponding one of the rows 41 of pixel locations during individual printing passes. Each printhead cartridge 21 contains a different color ink, typically the subtractive primary colors magenta, cyan, and yellow (other color shades are formed by depositing drops of these different colors in the same or nearby pixels), and a separate black ink printhead cartridge 21 for producing a "true" or process black richer than is achieved by mixing the subtractive primary colors. Drops of the black ink may also be used to producing some of the darker shades of other colors. The carriage 20 is moveable along the scan axis 2 by a carriage advance mechanism 15. The printer 10 also has a print medium advance mechanism 22 which advances the print medium 18 along a medium advance axis 4 so as to change the row 41 of pixel locations on which an individual printing element prints. The print medium advance mechanism 22 draws the print medium 18 into the printer 6 from an input tray 11b, and delivers the medium 18 after printing to an output tray 11a. The carriage advance mechanism 15 and the print medium advance mechanism 22 are well known to those skilled in the art, and will not be discussed further hereinafter. By combining the relative movement of the carriage 20 along the scan axis 2 with the relative movement of the print medium 18 along the medium advance axis 4, each printhead cartridge 21 can deposit one or more drops of ink at each individual one of the pixel locations 19 in the rows 41 and columns 42 on the print medium 18. The image processor 50 may be located in either the printer 6 or the computer 30, but typically some sub-processors of the image processor 50 are located in the computer 30 which other sub-processors are located in the printer 6, as will be discussed subsequently in further detail. In operation, the computer 30 typically acquires (eg. a photograph from a digital camera) or generates (eg. textual data or a graphic) a file of image data to be printed. During the printing process, the computer 30 performs its portion of the image processing function, and then transmits the partially-processed image data to the printer 6 to perform the remainder of the image processing function and produce the printed image. While all the partially-processed image data can be transmitted in a single step, more typically only a portion of data, such as a data swath, is transmitted and processed by the printer 6 at a time.

Figure 3:
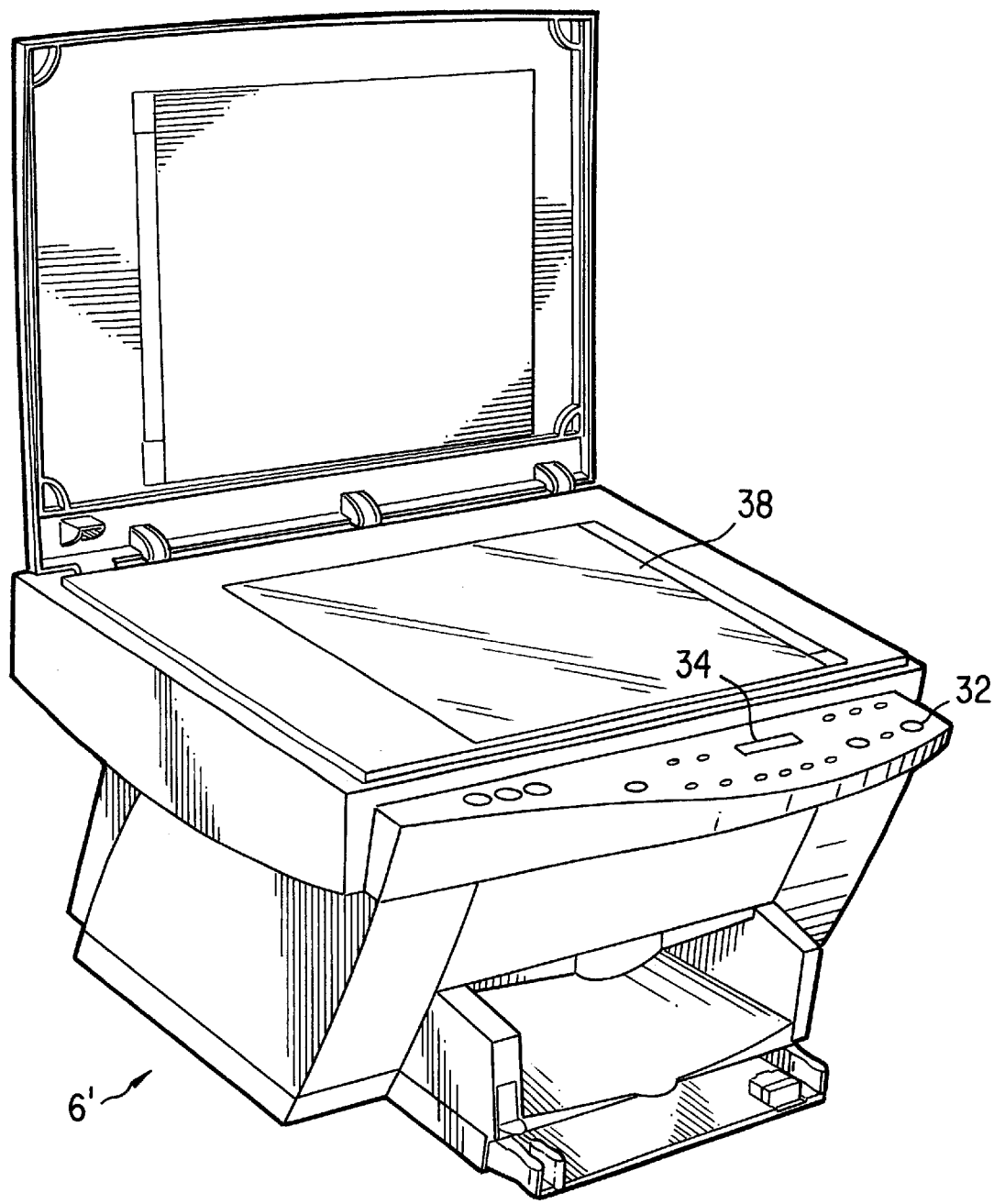
FIG. 3 is a schematic representation of the swath printing system of FIG. 1 incorporating a multifunction scanning and printing device.
Figure 4A:
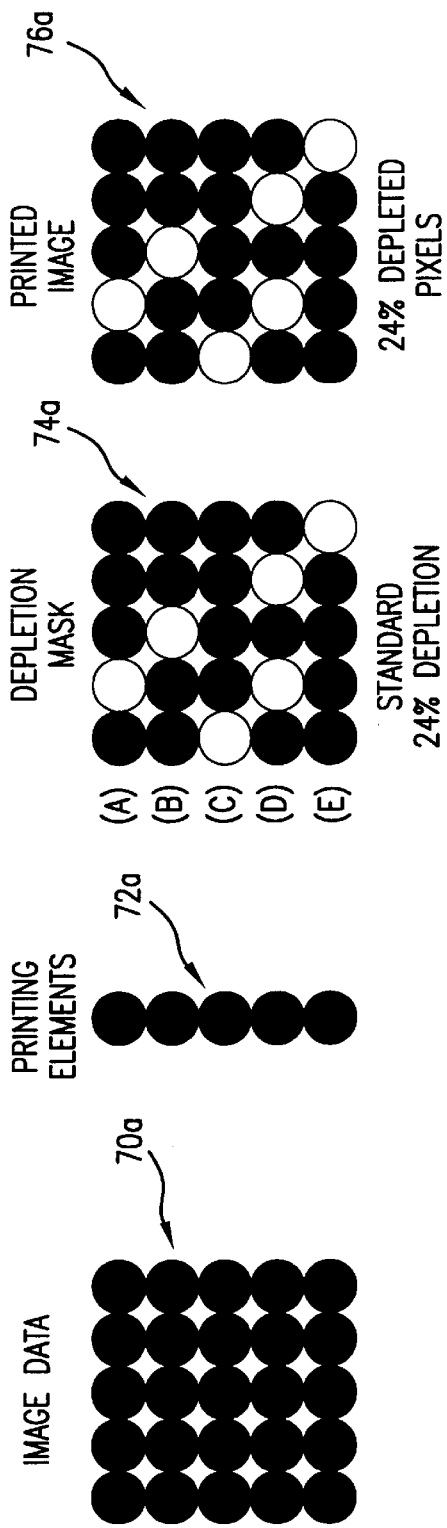
FIG. 4A is a schematic representation illustrating the printed output resulting from printing an exemplary high-density image pattern using an exemplary standard depletion mask applied to an exemplary set of functional printing elements.
Figure 4B:
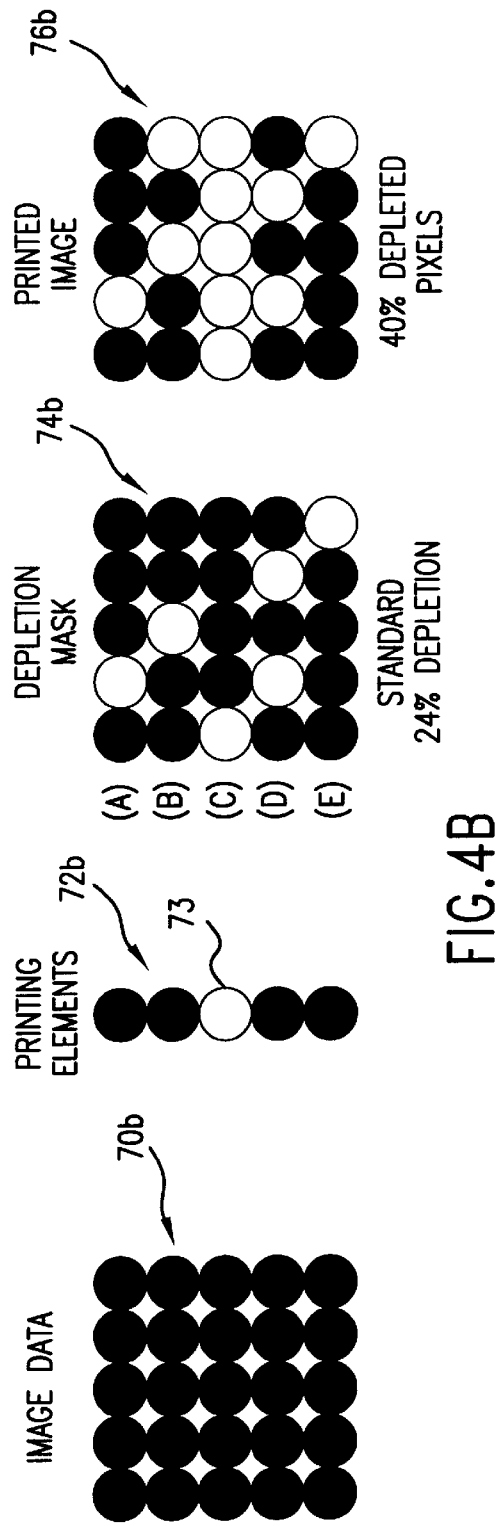
FIG. 4B is a schematic representation illustrating the printed output resulting from printing an exemplary high-density image pattern using an exemplary standard depletion mask applied to an exemplary set of printing elements, one of which is defective.
Figure 4C:
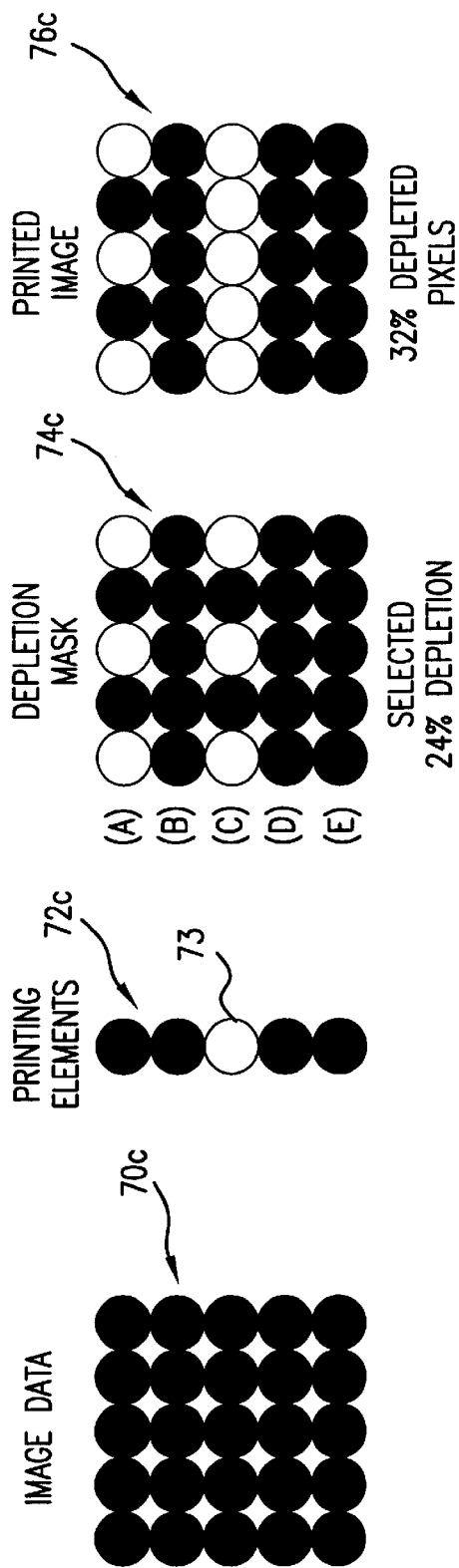
FIG. 4C is a schematic representation illustrating the printed output resulting from printing an exemplary high-density image pattern using an exemplary selected depletion mask applied to an exemplary set of printing elements, one of which is defective, in which the selected mask is chosen to compensate for the defective printing element.
Figure 4D:
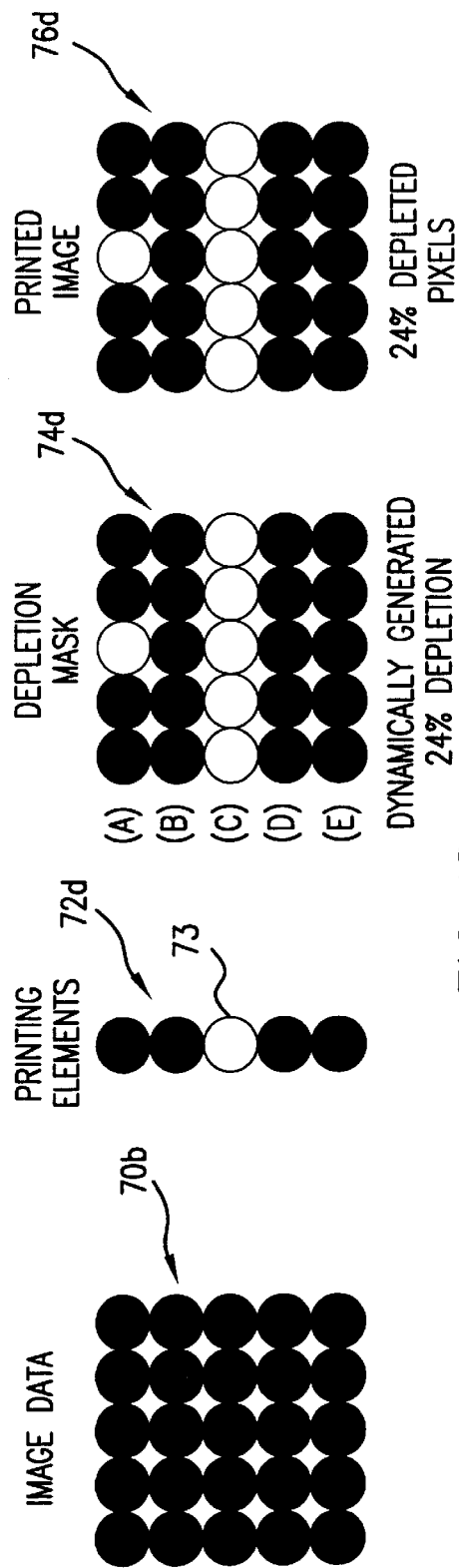
FIG. 4D is a schematic representation illustrating the printed output resulting from printing an exemplary high-density image pattern using an exemplary dynamically-generated depletion mask applied to an exemplary set of printing elements, one of which is defective, in which the dynamically-generated mask is constructed to compensate for the defective printing element.

An alternate embodiment of the printing system 10, as best understood with reference to FIG. 3, includes a multifunction device 6'. The multifunction device 6' typically includes the capability to optically scan an item such as a text document, a graphic or a photograph placed on a platen 38, and print the scanned image. Some multifunction devices 6' also include the capability to receive and print faxes or e-mail. A keyboard 32 and a display 34 for user interaction are typically included as part of the multifunction device 6'. The multifunction device 6' also typically includes the image processor 50.

Before considering the novel pixel deletion printing methods usable with the printing system 10, it is beneficial to consider in further detail—at the level of individual printing elements and pixels, and with reference to FIGS. 4A, 4B, 4C, and 4D—the operation of depletion masks, the impact of defective nozzles on print quality, and the benefits of adaptive pixel depletion. For illustrative purposes, assume an exemplary 5×5 pixel data pattern 70a,b,c,d having a uniform area, indicated by the filled-in circles, of a particular color. As will be discussed subsequently in greater detail, this pixel data pattern may represent a particular color (eg. black) in the RGB image data, or may represent an individual plane of data for a particular color ink in the printer 6. Each row in pattern 70*a,b,c,d* will be printed using the corresponding one of the printing elements 72*a,b,c,d*. However, to avoid the problems associated with excessive inking previously described, the data patterns 70*a,b,c,d* will be depleted by filtering the data according to the corresponding depletion mask 74*a,b,c,d* prior to printing. The empty circles in mask 74*a,b,c,d* represent depleted pixel positions, while the filled-in circles represent non-depleted pixel positions. Depletion masks are preferably constructed such that no two depleted pixel positions are vertically adjacent, and where possible no two depleted pixel positions are horizontally adjacent. It is readily seen that the exemplary depletion masks 74*a,b,c,d* deplete 6 of the 25 pixel positions in the mask, or 24% of the pixel positions. The resulting printed patterns 76*a,b,c,d* illustrate the printed output resulting from printing the corresponding data pattern 70*a,b,c,d* using the corresponding printing elements 72*a,b,c,d* and the corresponding depletion mask 74*a,b,c,d*. Filled-in circles in printed patterns 7*a,b,c,d* indicate data pixels for which at least one corresponding ink drop will be printed, while empty circles represent data pixels for which no ink drops will be printed.

Where all printing elements 72*a* are functional, the printed output 76*a* contains all but the depleted pixels, and thus has the intended 24% of white space. Because the ink drops typically spread out and overlap each other on the print medium, this produces a visually appealing result with little perceptible white space in the printed area corresponding to data pattern 70*a*.

Where one of the printing elements 72*b* is a defective printing element 73, and the data pattern 70*b* is printed using a 24% depletion mask with a standard depletion position arrangement 74*b*, the printed output 76*b* has 40% white space due to the row of pixel positions corresponding to the defective element 73. In addition, white spaces are vertically adjacent in several places. This results in "holes" or unprinted areas that are visually perceptible by a user and considered to be of unacceptable print quality.

Where one of the printing elements 72*c* is a defective printing element 73, and the data pattern 70*c* is printed using a 24% depletion mask with a depletion position arrangement 74*c* that compensates for defective printing elements but also provides acceptable print quality even when used with functional printing elements as will be discussed subsequently, the printed output 76*c* has 32% white space due to the row of pixel positions corresponding to the defective element 73. This depletion mask 74*c* results in more white space than would occur if no printing elements were defective, but significantly less than the 40% white space resulting from the standard mask 74*b*. In addition, the depletion positions of selected mask 74*c* produce no vertically adjacent white spaces. The reduced amount of white space in printed output 76*c* relative to printed output 76*b*, and the lack of vertically adjacent white spaces, provides a result with significantly improved print quality despite the defective nozzle 73.

Where one of the printing elements 72*d* is a defective printing element 73, and the data pattern 70*d* is printed using a 24% depletion mask with a depletion position arrangement 74*c* that is customized to compensate particularly well for the particular defective printing element pattern 72*d* (but which would provide less than optimal print quality if used with functional printing elements, as will be discussed subsequently), the printed output 76*d* has the desired 24% white space despite the row of pixel positions corresponding to the defective element 73. This customized depletion mask 74*d* results in the desired amount of white space by using all the pixel positions in the row printed by the defective nozzle as depleted pixels. Providing the desired amount of white space in the printed output 76*d* despite the presence of defective nozzle 73 results in significantly improved print quality compared to the printed output 76*b* using the standard mask 74*b*, and somewhat improved print quality compared to the printed output 76*c* using the mask 74*c*.

Figure 5A:
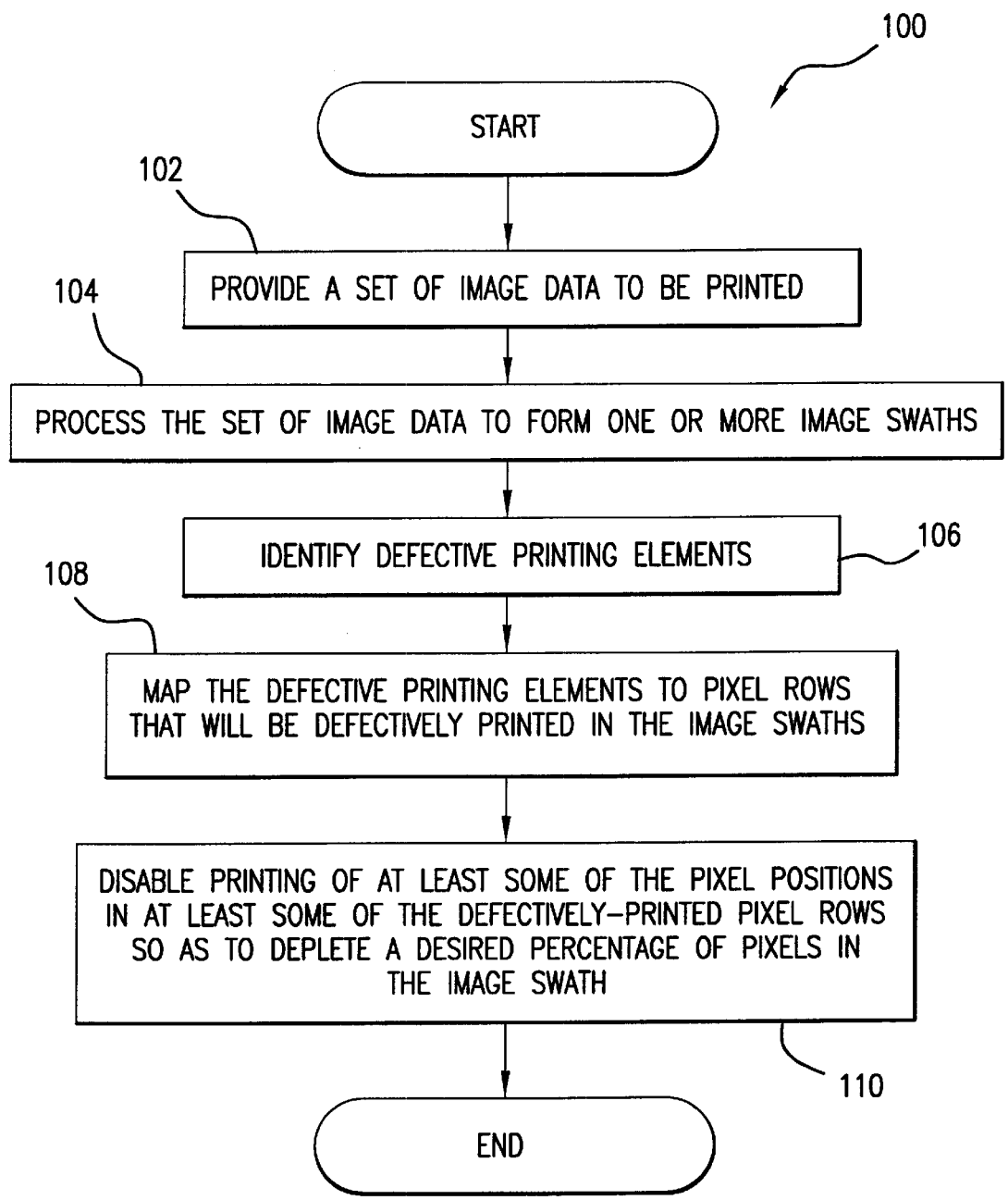
FIG. 5A is a top-level flowchart of a novel pixel deletion printing method usable with the swath printing system of FIG. 1.

Considering now a preferred novel pixel deletion printing method 100 usable with the printing system 10, and with reference to FIG. 5A, the method 100 starts at 102 by providing a set of image data to be printed. The image data is preferably in RGB format as commonly used in computer systems for storing data, although it can be in other formats. At 104, the set of image data is processed to form one or more image swaths to be printed on the medium. The size (height) of each swath typically corresponds to the number of pixel rows that can be printed by the swath printer 6 at a time, which in turn typically corresponds to the number of printing elements 24 in a print cartridge 21. At 106, any defective printing elements in the print cartridge (or cartridges) 21 are identified by elements and methods as heretofore described and referenced. At 108, the defective printing elements are mapped to the corresponding pixel rows that will be defectively printed in the image swaths. At 110, printing of at least some of the pixel positions in at least some of the defectively-printed pixel rows are disabled so as to deplete a desired percentage of pixels in the image swath.

Figure 5B:
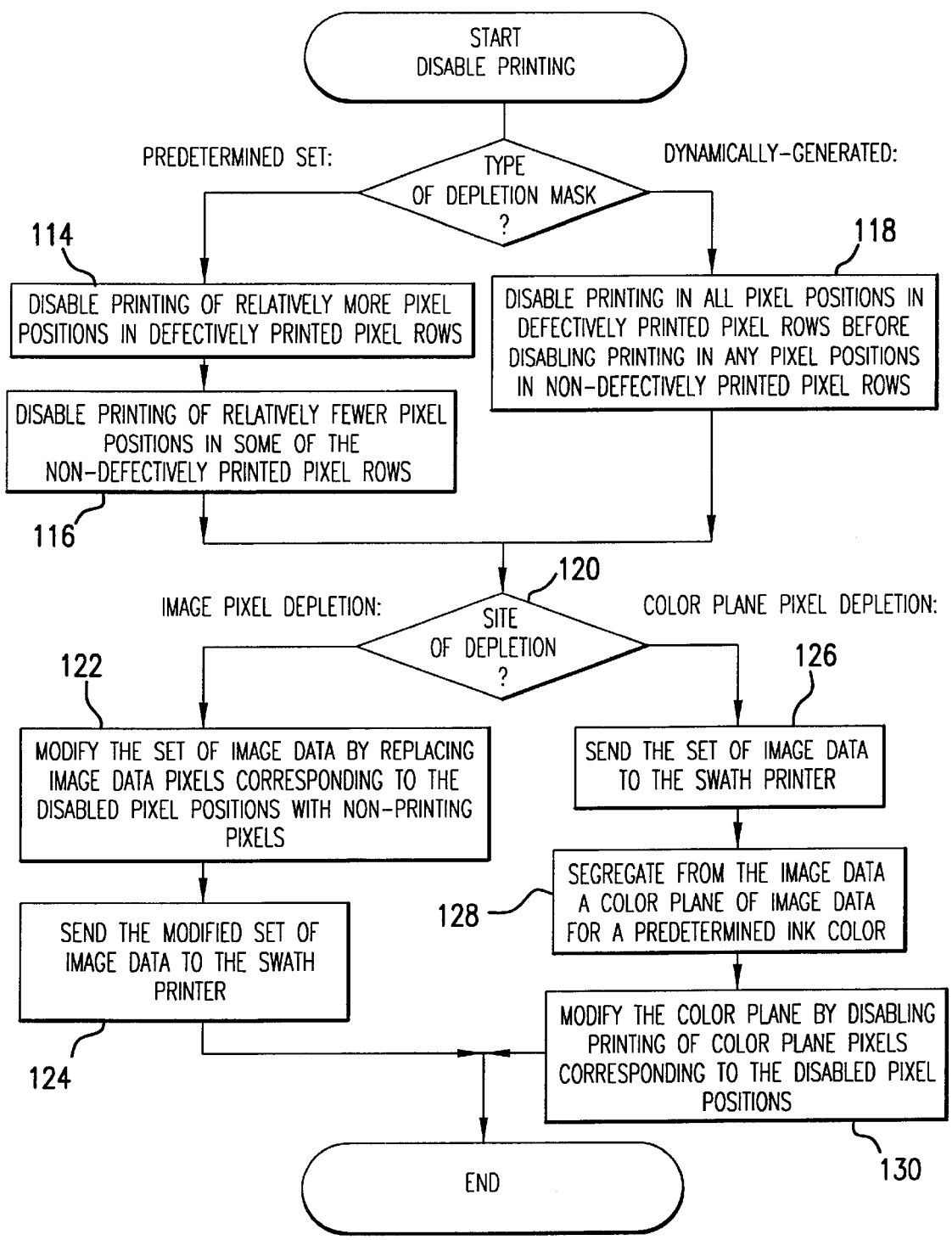
FIG. 5B is a lower-level flowchart of the method of FIG. 5A.

Considering now in further detail the printing 110, and with reference to FIG. 5B, the printing 110, at 112 the type of depletion mask to be used is determined. If the depletion mask has a depletion pattern that compensates for defective printing elements but also provides acceptable print quality even when used with functional printing elements ("Predetermined Set" branch of 112), then at 114 printing of relatively more pixel positions are disabled (i.e. depleted) in defectively printed pixel rows, and at 116 printing of relatively fewer pixel positions are disabled (i.e. depleted) in at least some of the non-defectively printed pixel rows. For example, it is readily seen that row C (corresponding to defective printing element 73) depletes three pixels in selected depletion mask 74*c*, while depleting only 1 pixel in standard depletion mask 74*b*; and that rows B, D, and E (each corresponding to functional printing elements) each deplete no pixels in selected depletion mask 74*c*, while each depleting one pixel in standard depletion mask 74*b*. The considerations that lead to the printing system 10 utilizing a predetermined set of depletion masks, and the selection of an optimal one of the set for use with a particular defective printing element pattern, will be discussed subsequently.

If the depletion mask has a depletion pattern that is customized solely to compensate for the particular defective printing element pattern of the printer 6 ("Dynamically Generated" branch of 112), then at 118 printing in all pixel positions in defectively printed pixel rows is disabled (i.e. depleted) before printing in any pixel positions in non-defectively printed pixel rows is disabled (i.e. depleted). For example, it is readily seen that all 5 pixel positions in row C (corresponding to defective printing element 73) are depleted in selected depletion mask 74*d*, and then the 1 additional pixel location needed to achieve the desired 24% depletion is taken from row A so as to avoid vertically adjacent pixels. The considerations that lead to the printing system 10 utilizing a dynamically-generated custom depletion mask will be discussed subsequently.

Figure 6:
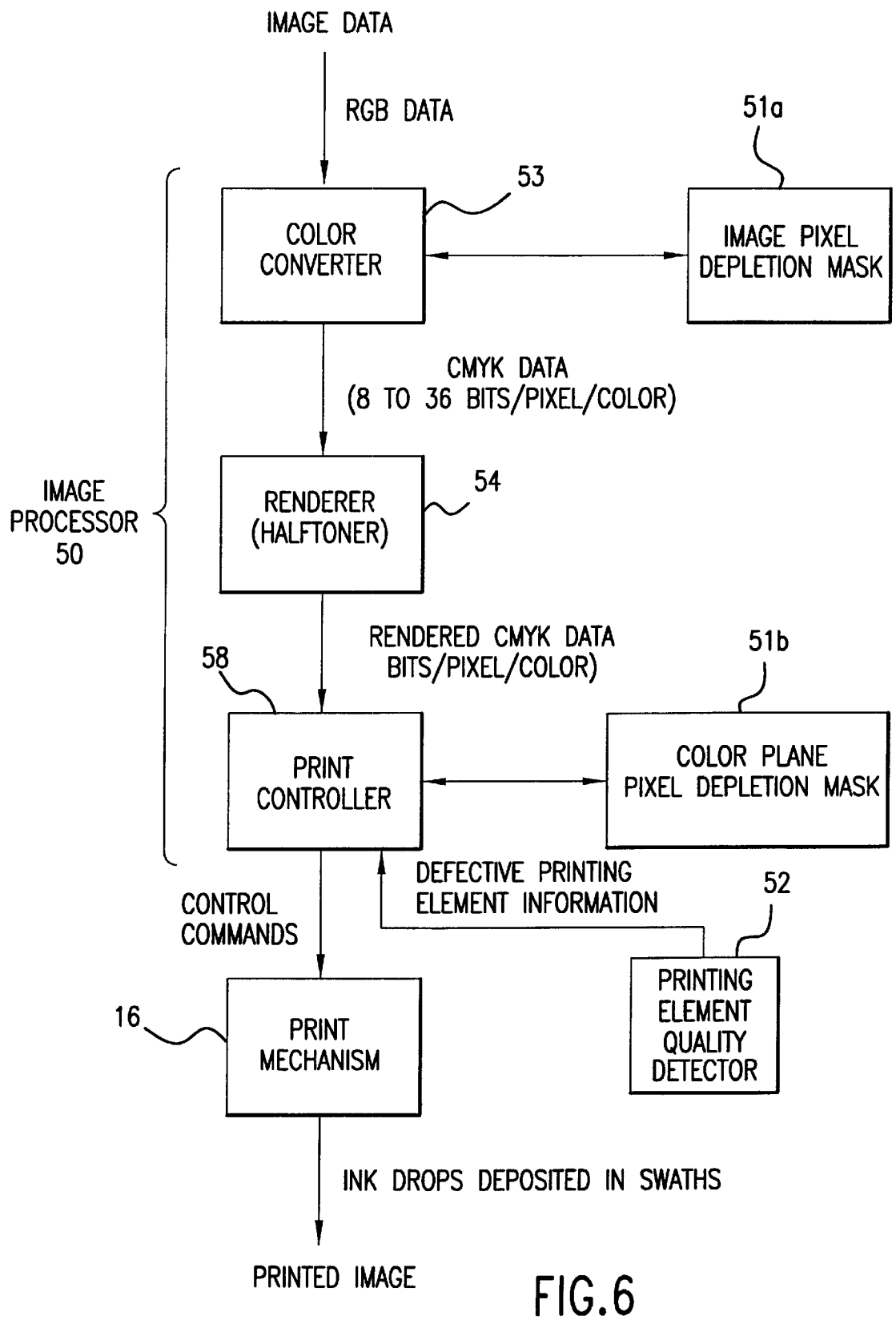
FIG. 6 is a more detailed schematic representation of the image processor of FIG. 1.

After performing either 116 or 118, the printing 110 continues at 120 by determining the site in the image processor 50 at which pixel depletion will be performed. As is best understood with reference to FIG. 6, the image processor 50 typically includes several sub-processors 53, 54, 58. A color converter 53 converts the RGB image data to be printed into toned (e.g. multiple intensity levels for each pixel, typically 256 such levels) color data corresponding to the colors of the inks used in the printer, typically cyan, magenta, yellow, and black as previously described. A halftoner or renderer 54 then normalizes the CMYK data to form rendered CMYK data by reducing the number of intensity levels of each pixel in the data to match the number of intensity levels provided by the printer. Printers typically have a very limited number of intensity levels, typically four to eight for cyan, magenta, and black, and two to four for black. In some embodiments, only two intensity levels ("printed" and "unprinted") may be provided. Pixel depletion may be done in either of two places. In the preferred embodiment, an image pixel depletion mask 51a is used by the color converter 53 to deplete image pixels during the conversion of RGB data to CMYK data. In an alternate embodiment, a color plane pixel depletion mask 51b is used by the print controller 58 to deplete pixels for individual ones of the cyan, magenta, yellow, or black color planes during the process issuing control commands to the print mechanism 16 to emit the various colored ink drops onto the print medium 18.

Returning to the printing 110, if depletion is to be done by the color converter 53 ("Image Pixel Depletion" branch of 120), the image data is modified by replacing image data pixels corresponding to the disabled pixel positions in the image pixel depletion mask 51a with non-printing (i.e. white space producing) pixels. Then, at 124, the modified set of image data is sent to the swath printer 6 to print, and the printing 110 concludes. If depletion is to be done by the print controller 58 instead, then at 126 the image data is sent to the swath printer 6. At 128, a color plane of image data for a predetermined ink color is segregated. At 130 the color plane is modified by disabling printing of color plane pixels corresponding to the disabled pixel positions in the color plane depletion mask 51b and then issuing the control commands to print the color planes.

Figure 7A:
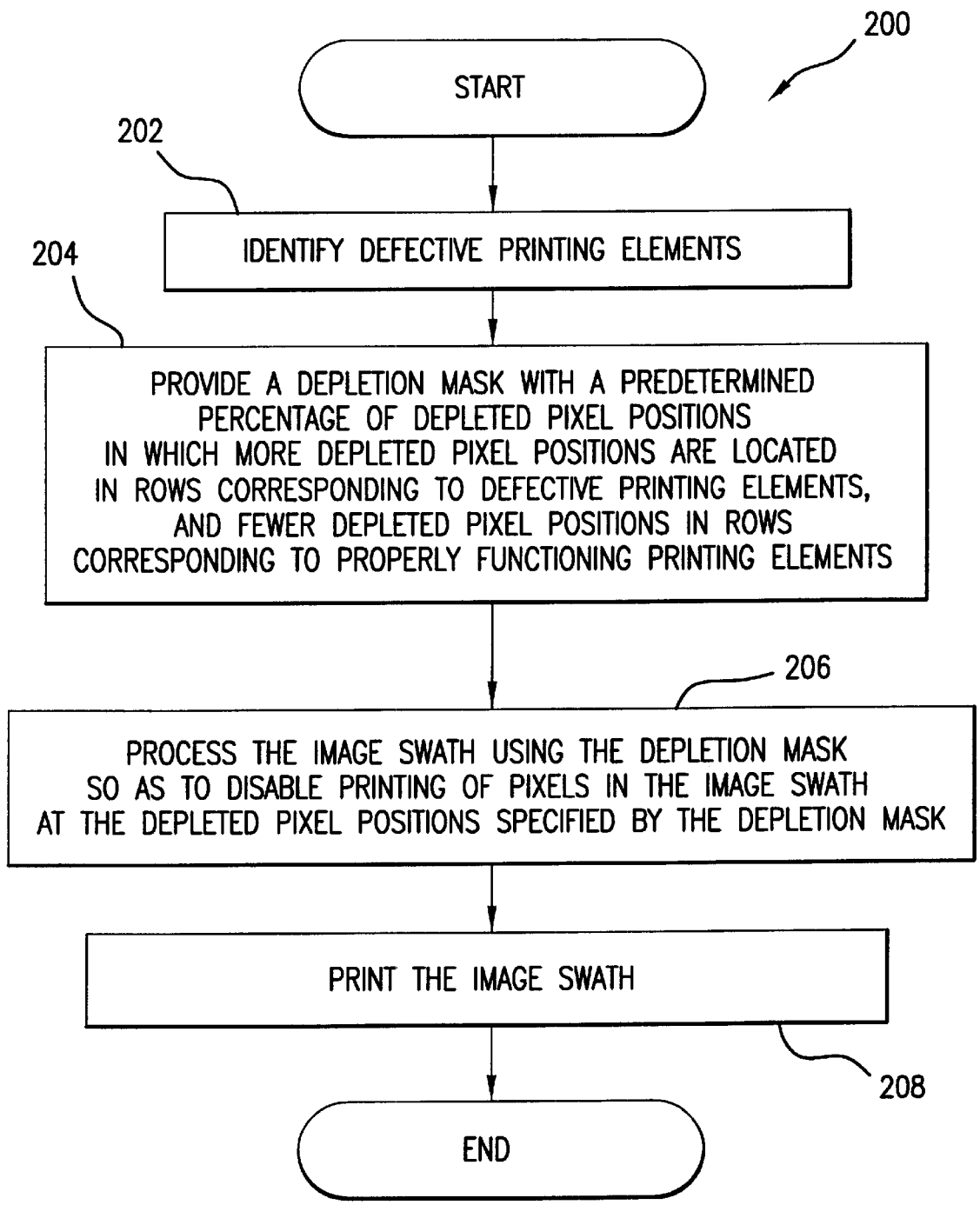
FIG. 7A is a top-level flowchart of another novel pixel deletion printing method usable with the swath printing system of FIG. 1.

Considering now another preferred novel pixel deletion printing method 200 usable with the printing system 10, and with reference to FIG. 7A, the method 200 starts at 202 by identifying defective printing elements 24 in the printing system 10. At 204, the method provides a depletion mask 51 having a predetermined percentage of depleted pixel positions. More of the depleted pixel positions are located in at least some pixel rows 41 which correspond to defective printing elements 24, and fewer of the depleted pixel positions are located in at least some rows 41 which correspond to properly functioning printing elements. The terms "more" and "fewer" are relative to locating a substantially equal number or percentage of depleted pixel positions in each row, as is provided by way of example in the standard depletion mask 74b. At 206, and as heretofore described, the image swath is processed using the depletion mask 51 so as to disable the printing of image pixels in the swath at the depleted pixel positions specified by the depletion mask 51. At 208, the processed image swath is printed, preferably using a single-pass printmode, and the printing method 200 ends.

Figure 8:
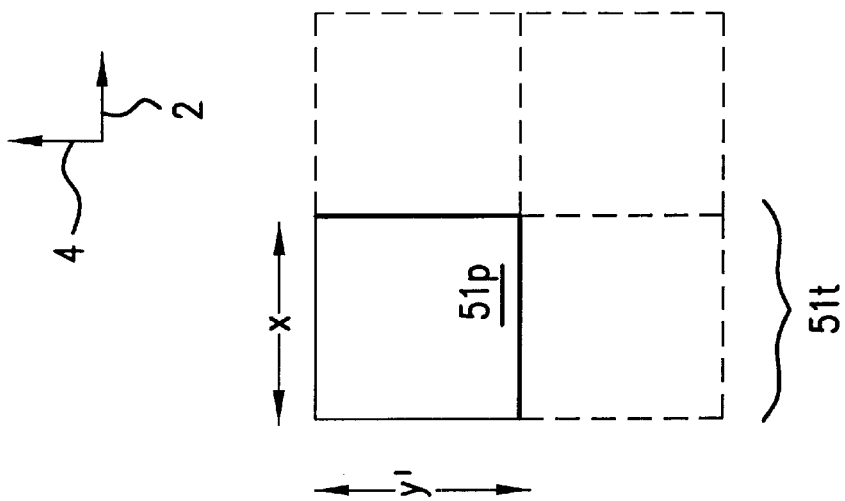
FIG. 8 is a schematic representation showing the dimensioning and replication of a dynamically-generated depletion mask and a selected depletion mask primitive according to the present invention.
Figure 8:
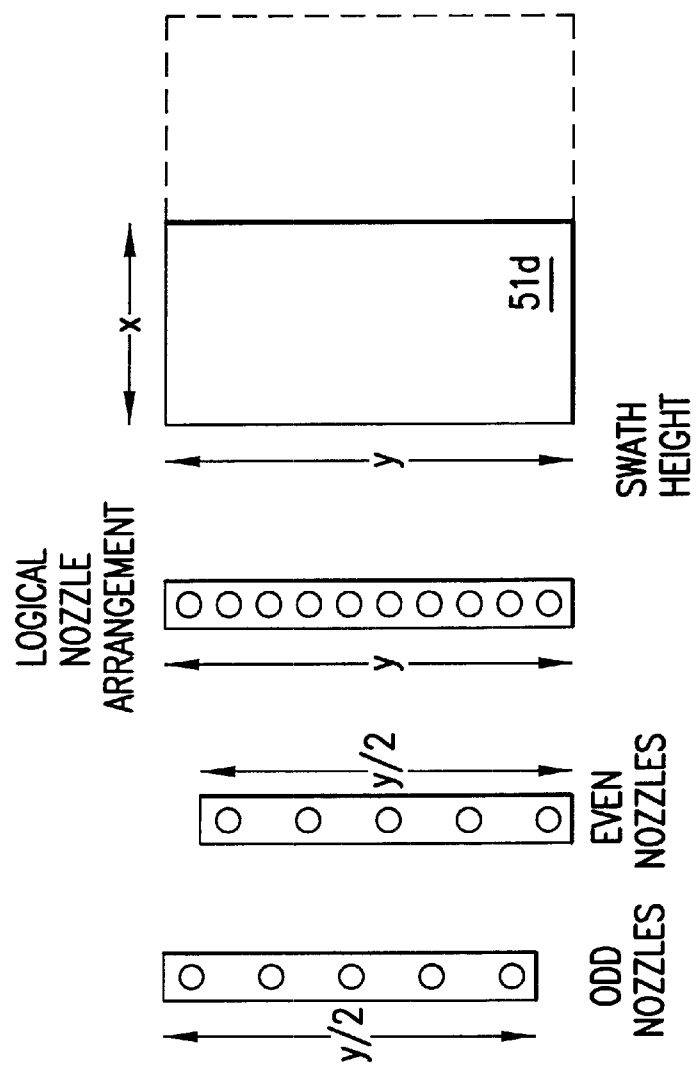

Before discussing in further detail the providing 204 of a depletion mask 51, and as best understood with reference to FIG. 8, as previously discussed a depletion mask 51 may either be (a) chosen from a predetermined set of mask patterns (or primitives), or (b) dynamically generated. Printing system resource tradeoffs typically determine which type of depletion mask 51 a printing system 10 will choose to utilize. If a printing system 10 contains a relatively large amount of memory (so as to store a large depletion mask), and has a processor with relatively large amount of computational power (so as to generate a mask in an appropriate amount of time), the system 10 will preferably generate dynamically a swath-high depletion mask 51d customized for the particular arrangement of functional and defective printing elements 24 in each print cartridge 21. Dynamically generating a swath-high depletion mask 51d provides the best reduction of excess white space (as previously indicated in FIG. 4D), and easily corrects for multiple defective printing elements by allowing a custom depletion pattern to be specified which addresses all the defective printing elements 24 of the print cartridge 21. In general, the mask 51d first depletes pixels on the rows printed on by defective printing elements 24 before depleting any pixels on rows printed on by functional printing elements 24, since the defective elements will produce unprinted pixel locations whether they are depleted or not. Such a depletion mask 51d typically is an x-by-y matrix, where y is equal to the number of logical printing elements 24 of a print cartridge 21, and x is typically between 5 and 8. Given sufficient memory, x could be expanded up to the number of pixels in a row 41. During printing, the depletion mask 51d is replicated along the scan axis 2 as required to print the swath.

Conversely, if a printing system 10 contains a relatively small amount of memory or has a processor with a relatively small amount of computational power, the system 10 will preferably select and replicate one of a predefined set of smaller (e.g. less than swath-high) depletion mask primitives, in order to reduce the computational and memory resources required for depletion. Each such depletion mask primitive 51p typically is an x2-by-y2 matrix, where x2 and y2 are typically between 5 and 8. A sufficient number of mask primitives, such as primitive 51p, are provided in the set so as to allow a selection that will compensate for a defective printing element 24 on any row of the mask primitive 51p. During printing, the selected depletion mask primitive 51p is replicated along the scan axis 2 and the medium advance axis 4 as required to print the swath. Because the depletion mask primitive 51p selected to compensate for a defective printing element 24 in a certain row of the mask primitive 51p is likely after replication to also govern printing of a functional printing element 24 in that certain row, it is generally not advisable to deplete all the pixels in that row of the mask primitive 51p, which would have the effect of printing a complete row of the image as an unprinted line. Therefore, more depleted pixel positions must be distributed to other rows of the mask primitive 51p, which somewhat increases the percentage of white space over what is optimal, as was previously discussed with reference to FIG. 4C. In addition, if there is more than one defective printing element 24 in a print cartridge 21, the defective printing elements 24 may not align with the same row of the mask primitive 51p; in such a situation, it may only be possible to correct for one of the defective elements 24, not all of them.

Figure 7B:
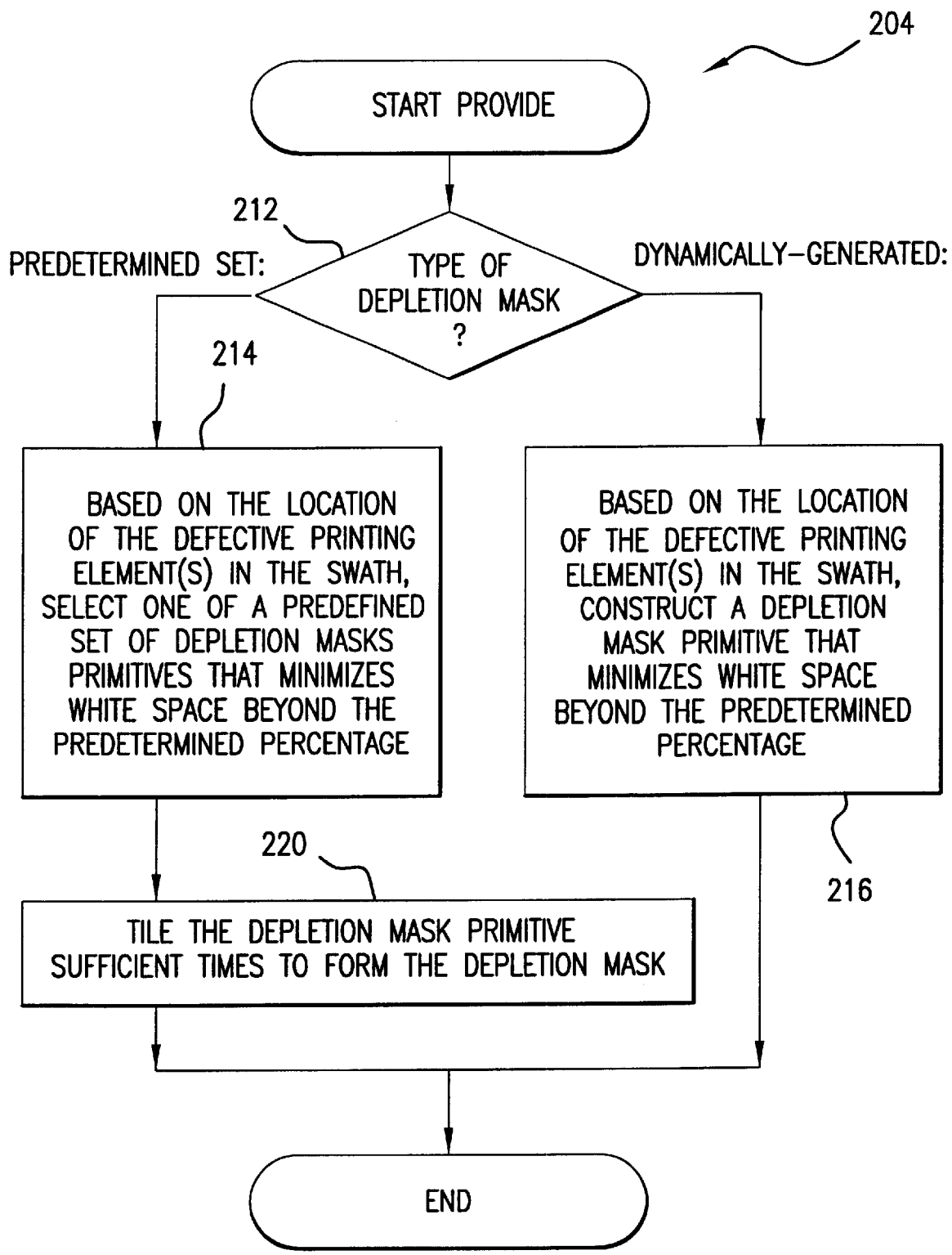
FIGS. 7B–7C are lower-level flowcharts of the method of FIG. 7A.

Considering now in further detail the providing 204 of a depletion mask 51, and with reference to FIG. 7B, at 212 the type of depletion mask 51 to be used is determined. If the printing system 10 provides a predefined set of mask depletion primitives ("Predetermined Set" branch of 212), then at 214 one of the predefined set of depletion mask primitives 51p is selected, as explained above, based on the location of the defective printing element (or elements) 24 in the swath, with a goal of minimizing the amount of excess unprinted "white space" on the medium 18 beyond the desired depletion percentage. At 220, the depletion mask primitive 51p is tiled sufficient times in the medium advance axis 4 in order to form a depletion mask 51t that has a number of mask rows equal to the number of printing elements 24 in the print cartridge 21. If the printing system 10 dynamically generates the depletion mask ("Dynamically-generated" branch of 212), then at 216 the depletion mask 51d is constructed, based on the location of the defective printing element(s) in the swath, that minimizes the amount of white space beyond the predetermined percentage, and that preferably also minimizes vertically adjacent white space (i.e. unprinted pixels in the same column 42).

Figure 7C:
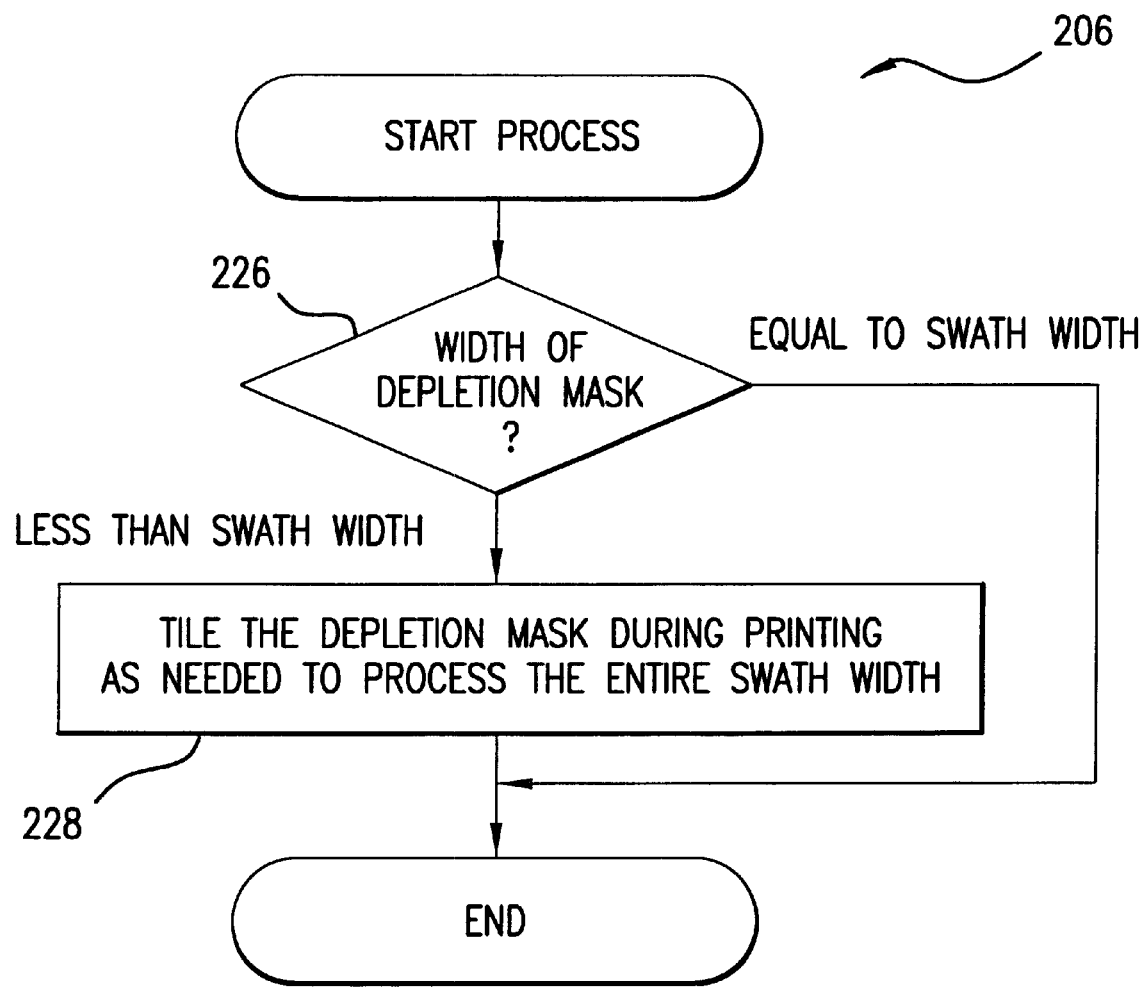

Considering now in further detail the processing 206 of an image swath, and with reference to FIG. 7C, at 226 the width of the depletion mask 51 is ascertained. If the width of the mask 51 is less than the width of the swath ("Less than Swath Width" branch of 226), then at 228 the depletion mask is tiled during the processing of the swath as needed in order to govern depletion of the entire swath width.

The present invention can also be implemented as a program storage medium 60 containing a program of instructions which can be read and executed by the computer 30. The medium 60 can be a floppy disk, CD-ROM, flash memory, ROM, RAM, remote computer, or the like which can be communicatively coupled intermittently or permanently to the computer 30. Different segments of the program are configured to receive data identifying defective printing elements 24; map at least some of these elements 24 to corresponding lower print quality rows 41 of the image data file; specify a depletion mask 51 for the rows and columns of image pixels having a predetermined percentage of depleted pixels, relatively more or which are located in at least some of the lower print quality rows 41 and relatively fewer of which are located in at least some other rows 41; and modify the image data file by replacing image data pixels corresponding to depleted pixel positions with non-printing data pixels.

From the foregoing it will be appreciated that the swath printing system and pixel deletion printing methods provided by the present invention represent a significant advance in the art. Although several specific embodiments of the invention have been described and illustrated, the invention is not limited to the specific methods, forms, or arrangements of parts so described and illustrated. In particular, while the present invention has been described with reference to cyan, magenta, yellow, and black printing inks, it is also applicable to other ink color sets used to print documents and images. The invention is limited only by the claims.

What is claimed is:

1. A method for printing pixel rows of an image swath with a swath printer, comprising:

identifying defective printing elements of the swath printer;

mapping at least one of the defective printing elements to a corresponding low quality one of the pixel rows; and disabling printing of at least some individual pixel positions in at least one of the low quality ones of the pixel rows so as to deplete a percentage of pixels in the image swath.

2. The method of claim 1, wherein the disabling further comprises:

disabling printing of more individual pixel positions in the low quality ones of the pixel rows than in the other ones of the pixel rows.

3. The method of claim 2, further comprising:

providing image data; and processing the image data to form the image swath.

4. The method of claim 3, wherein the disabling further comprises:

modifying the image data by replacing image data pixels corresponding to the at least some individual pixel positions with non-printing pixels.

5. The method of claim 4, further comprising:

sending the modified image data to the swath printer.

6. The method of claim 3, wherein the disabling further comprises:

segregating from the image data at least one color plane of pixel data for a predetermined ink color; and modifying the at least one color plane of image data by disabling printing of the color plane pixels corresponding to the at least some individual pixel positions.

7. The method of claim 2, wherein the disabling further comprises:

disabling printing in all individual pixel positions in the low quality ones of the pixel rows before disabling printing in any individual pixel positions in the other ones of the pixel rows.

8. A method for printing rows and columns of an image swath with a swath printer, comprising:

identifying defective printing elements of the swath printer;

providing a depletion mask for the rows and columns having a predetermined percentage of depleted pixels, the mask having relatively more depleted pixel positions in at least some rows corresponding to the defective printing elements and relatively fewer depleted pixel positions in at least some other rows corresponding to other printing elements; and processing the image swath with the depletion mask so as to deplete the predetermined percentage of pixels from the swath.

9. The method of claim 8, wherein the processing further comprises:

disabling printing of pixel positions in the image swath at the depleted pixel positions specified by the depletion mask.

10. The method of claim 8, wherein the providing further comprises:

selecting one of a predefined set of depletion masks based on the defective printing elements.

11. The method of claim 8, wherein the providing further comprises:

constructing the depletion mask based on the defective printing elements.

12. The method of claim 8, wherein the providing further comprises:

selecting one of a predefined set of depletion mask primitives based on at least one of the defective printing elements, each depletion mask primitive having a width less than or equal to the number of swath columns and a height less than or equal to the number of swath rows; and tilling the depletion mask primitives in the column direction and the row direction to form the depletion mask so as to encompass the total number of swath rows and swath columns.

13. The method of claim 8, wherein the printing further comprises:

fully printing the swath in only a single printing pass.

14. The method of claim 8, wherein no two adjacent pixel positions in a column are depleted pixel positions.

15. A swath printer, comprising:

means for identifying defective printing elements of the swath printer;

means for mapping at least one of the defective printing elements to a corresponding low quality one of the pixel rows; and means for disabling printing of at least some individual pixel positions in at least one of the low quality ones of the pixel rows so as to deplete a percentage of pixels in the image swath.

16. A swath printing system, comprising:

a print mechanism responsive to control commands for printing drops of at least one colored ink from a plurality of printing elements onto specific pixel locations of a print medium to print an image;

a depletion mask having depleting positions for disabling the printing of a predetermined percentage of the drops, the mask having relatively more depleting positions corresponding to pixel locations for defective printing elements and relatively fewer depleting positions corresponding to pixel locations for other printing elements; and an image processor connected to the depletion mask and the print mechanism, the image processor adapted to receive and process image data according to the depletion mask so as to generate the control commands.

17. The swath printing system of claim 16, further comprising:

a printing element quality detector connected to the print mechanism and the image processor for identifying defective ones of the plurality of printing elements; and wherein the image processor specifies the depleting positions of the depletion mask based on the defective ones of the plurality of printing elements.

18. The swath printing system of claim 16, further comprising:

a printing element quality detector connected to the print mechanism and the image processor for identifying defective ones of the plurality of printing elements;

wherein the depletion mask includes a plurality of alternate depletion masks and the image processor selects an optimal one of the alternate depletion masks for processing the image data based on the defective ones of the plurality of printing elements.

19. A program storage medium readable by a computing apparatus, tangibly embodying a program of instructions executable by the computing apparatus for preparing for printing on a swath printer an image data file having rows and columns of image pixels, the program storage medium comprising:

a first segment of the instructions configured to receive data identifying defective printing elements of the swath printer;

a second segment of the instructions configured to map at least some of the defective printing elements to corresponding lower print quality rows of the image data file;

a third segment of the instructions configured to specify a depletion mask for the rows and columns of image pixels, the mask having a predetermined percentage of depleted pixels with relatively more depleted pixel positions in at least some of the corresponding lower print quality rows and relatively fewer depleted pixel positions in at least some other rows; and a fourth segment of the instructions configured to modify the image data file by replacing image data pixels corresponding to depleted pixel positions with non-printing data pixels.

* * * * *

UNITED STATES PATENT AND TRADEMARK OFFICE
CERTIFICATE OF CORRECTION

PATENT NO. : 6,454,392 B1  
DATED : September 24, 2002  
INVENTOR(S) : Lopez et al.

It is certified that error appears in the above-identified patent and that said Letters Patent is hereby corrected as shown below:

<u>Column 12,</u>  
Line 64, "tilling" should read -- tiling --.

Signed and Sealed this

Twelfth Day of August, 2003

JAMES E. ROGAN  
*Director of the United States Patent and Trademark Office*